(12) United States Patent
Jung et al.

(10) Patent No.: US 8,294,754 B2
(45) Date of Patent: Oct. 23, 2012

(54) METADATA GENERATING METHOD AND APPARATUS AND IMAGE PROCESSING METHOD AND APPARATUS USING METADATA

(75) Inventors: Kil-soo Jung, Osan-si (KR); Hye-young Jun, Suwon-si (KR); Dae-jong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 625 days.

(21) Appl. No.: 12/556,678

(22) Filed: Sep. 10, 2009

(65) Prior Publication Data

US 2010/0225740 A1  Sep. 9, 2010

(30) Foreign Application Priority Data

Mar. 4, 2009  (KR) .......................... 10-2009-0018463

(51) Int. Cl.
*H04N 15/00* (2006.01)
*H04N 13/04* (2006.01)
(52) U.S. Cl. ................. 348/60; 348/43; 348/46
(58) Field of Classification Search .............. 348/43, 348/46, 51, 60
See application file for complete search history.

(56) References Cited

U.S. PATENT DOCUMENTS

| | | | | |
|---|---|---|---|---|
| 5,999,189 A * | 12/1999 | Kajiya et al. | ................. | 382/232 |
| 6,134,346 A * | 10/2000 | Berman et al. | ................. | 382/163 |
| 6,445,833 B1 | 9/2002 | Murata et al. | | |
| 6,859,256 B2 * | 2/2005 | Montgomery et al. | ......... | 355/22 |
| 7,446,733 B1 * | 11/2008 | Hirimai | .......................... | 345/32 |
| 7,609,330 B2 * | 10/2009 | Kim | ................................. | 349/15 |
| 7,894,005 B2 * | 2/2011 | Kim | ................................. | 349/15 |
| 8,111,906 B2 * | 2/2012 | Song et al. | .................... | 382/154 |
| 8,154,781 B2 * | 4/2012 | Kroll et al. | ....................... | 359/9 |
| 2001/0041307 A1 * | 11/2001 | Lee et al. | ...................... | 430/312 |
| 2002/0191823 A1 * | 12/2002 | Wehrli et al. | ................. | 382/128 |
| 2003/0108251 A1 | 6/2003 | Kim et al. | | |
| 2003/0234980 A1 * | 12/2003 | Montgomery et al. | ....... | 359/462 |
| 2007/0242068 A1 * | 10/2007 | Han et al. | ...................... | 345/427 |
| 2010/0225740 A1 * | 9/2010 | Jung et al. | ....................... | 348/42 |

FOREIGN PATENT DOCUMENTS

| | | |
|---|---|---|
| KR | 10-2000-0067890 | 11/2000 |
| KR | 10-2003-0047552 | 6/2003 |
| KR | 10-2005-0121080 | 12/2005 |

OTHER PUBLICATIONS

International Search Report issued on Sep. 28, 2010, in corresponding PCT International Application No. PCT/KR2010/001023 (9 pages).

* cited by examiner

*Primary Examiner* — Michael Won
(74) *Attorney, Agent, or Firm* — NSIP Law

(57) ABSTRACT

A metadata generating method including: receiving sub-region dividing information to divide an object into a plurality of sub-regions; and generating sub-region indicating information to indicate each of the plurality of sub-regions divided according to the sub-region dividing information.

28 Claims, 7 Drawing Sheets

OPAQUE REGION

TRANSPARENT REGION

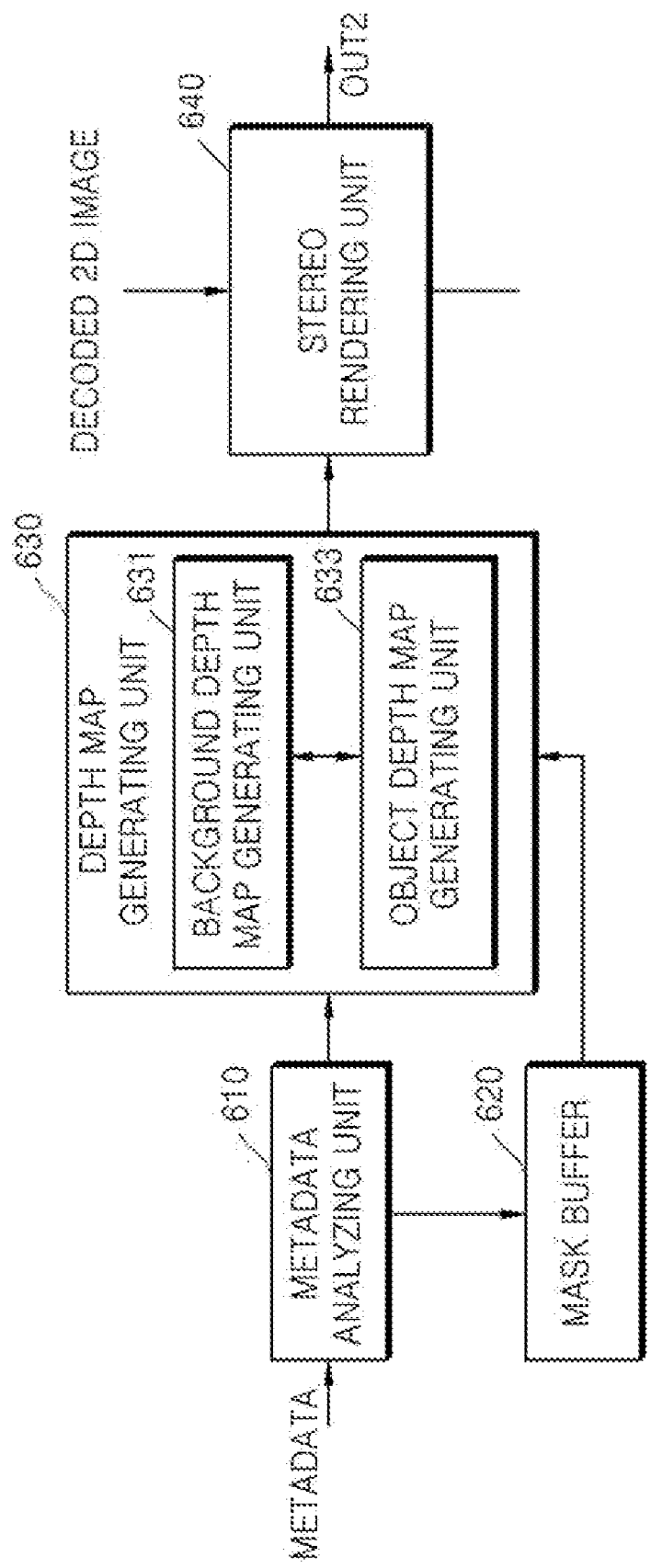

METADATA GENERATING METHOD AND APPARATUS AND IMAGE PROCESSING METHOD AND APPARATUS USING METADATA

CROSS-REFERENCE TO RELATED APPLICATION

This application claims the benefit of Korean Patent Application No. 10-2009-0018463, filed on Mar. 4, 2009 in the Korean Intellectual Property Office, the disclosure of which is incorporated herein in its entirety by reference.

BACKGROUND OF THE INVENTION

1. Field of the Invention

Aspects of the present invention relate to a metadata generating method and apparatus and an image processing method and apparatus using metadata, and more particularly, to a method of generating sub-region indicating information for each sub region of an object and incorporating the generated sub-region indicating information into metadata, thereby allowing an object including a transparent region to be naturally converted into a three-dimensional (3D) image during image processing.

2. Description of the Related Art

With the development of digital technology, three-dimensional (3D) image technology has become widely spread. The 3D image technology expresses a more realistic image by adding depth information to a two-dimensional (2D) image. Since human eyes are spaced a predetermined distance apart in a horizontal direction, the left eye and the right eye see a 2D image differently. This phenomenon is called binocular disparity. The brain combines the two different 2D images, thereby generating a 3D image having perspective and presence.

The 3D image technology can be classified into technology to generate video data as a 3D image and technology to convert video data generated as a 2D image into a 3D image. Both technologies have been studied together.

SUMMARY OF THE INVENTION

Aspects of the present invention provide a metadata generating method and apparatus and an image processing method and apparatus using metadata, in which an object is divided into a plurality of sub-regions and metadata including sub-region indicating information to identify each of the plurality of sub-regions is generated such that a two-dimensional (2D) image is converted into a three-dimensional (3D) image by using the generated metadata during image processing.

According to an aspect of the present invention, there is provided a metadata generating method, wherein the metadata is used to convert a two-dimensional (2D) image into a three-dimensional (3D) image, the method including: receiving sub-region dividing information to divide an object of the 2D image into a plurality of sub-regions; and generating sub-region indicating information to indicate each of the plurality of sub-regions according to the sub-region dividing information.

According to an aspect of the present invention, the sub-region dividing information may include information to divide the object into a transparent region and an opaque region, and the generating of the sub-region indicating information may include generating the sub-region indicating information to separately indicate the transparent region and the opaque region.

According to an aspect of the present invention, the generating of the sub-region indicating information may include generating a transparent region indicating mask to indicate the transparent region and an opaque region indicating mask to indicate the opaque region.

According to an aspect of the present invention, the generating of the opaque region indicating mask may include generating a mask in which the opaque region has a first color and a remaining region of the 2D image other than the opaque region has a second color, different from the first color.

According to an aspect of the present invention, the generating of the transparent region indicating mask may include generating a mask in which a portion of an edge of the transparent region that does not intersect with the opaque region has the first color, and the remaining portion of the edge of the transparent region that intersects with the opaque region has the second color.

According to an aspect of the present invention, the metadata generating method may further include generating metadata to convert the 2D image into the 3D image, and the metadata may include information about the transparent region indicating mask and the opaque region indicating mask and depth values to be respectively applied to corresponding sub-regions identified by each of the transparent region indicating mask and the opaque region indicating mask.

According to an aspect of the present invention, the generating of the sub-region indicating information may include generating coordinate information to separately indicate the transparent region and the opaque region.

According to an aspect of the present invention, the generating of the coordinate information indicating the transparent region may include generating coordinate information to indicate only a portion of the edge of the transparent region that does not intersect with the opaque region.

According to an aspect of the present invention, the metadata generating method may further include generating metadata to convert the 2D image into the 3D image, and the metadata may include coordinate information to indicate the transparent region, coordinate information to indicate the opaque region, and respective depth values to be applied to the corresponding coordinate information.

According to another aspect of the present invention, there is provided a computer-readable recording medium having recorded thereon metadata used to convert a two-dimensional (2D) image into a three-dimensional (3D) image, wherein the metadata includes background depth information to add depth to a background included in the 2D image and object depth information to add depth to an object included in the 2D image, and in which the object depth information includes sub-region indicating information to separately indicate a transparent region and an opaque region of the object and a depth value to be applied to each of the transparent region and the opaque region.

According to another aspect of the present invention, there is provided a depth information generating apparatus including: a background depth information generating unit to generate depth information for a background of a 2D image; and an object depth information generating unit to generate depth information for an object of the 2D image, wherein the object depth information generating unit includes a sub-region dividing information input unit to receive sub-region dividing information to divide the object into a plurality of sub-regions, and a sub-region indicating information generating unit to generate sub-region indicating information to indicate each of the plurality of sub-regions divided according to the sub-region dividing information.

According to yet another aspect of the present invention, there is provided an image processing method including: generating a depth map for a background of a 2D image by using background depth information included in metadata; and generating a depth map for an object of the 2D image by using object depth information included in the metadata, wherein the generating of the depth map for the object includes generating the depth map for the object by using sub-region indicating information separately indicating a transparent region and an opaque region of the object, the sub-region indicating information being included in the object depth information.

According to still another aspect of the present invention, there is provided an image processing apparatus including: a background depth map generating unit to generate a depth map for a background of a 2D image by using background depth information included in metadata; and an object depth map generating unit to generate a depth map for an object of the 2D image by using object depth information included in the metadata, wherein the object depth map generating unit generates the depth map for the object by using sub-region indicating information to separately indicate a transparent region and an opaque region of the object, the sub-region indicating information being included in the object depth information.

According to another aspect of the present invention, there is provided a depth information generating apparatus to generate depth information for an object of a 2D image relative to a background of the 2D image, the depth information generating apparatus including: a sub-region dividing information input unit to receive sub-region dividing information to divide the object into a plurality of sub-regions; a sub-region indicating information generating unit to generate sub-region indicating information to separately identify each of the plurality of sub-regions according to the sub-region dividing information; and a depth information input unit to receive respective depth values for the plurality of sub-groups.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a block diagram of an image processing apparatus according to an embodiment of the present invention.

DETAILED DESCRIPTION OF THE EMBODIMENTS

Figure 1:
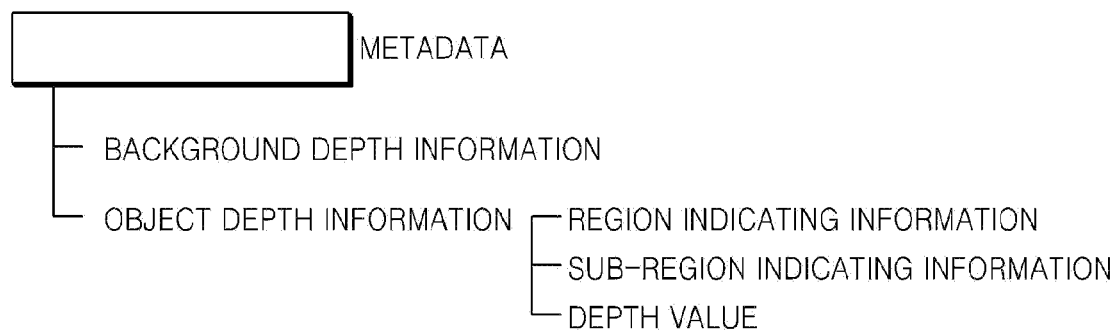
FIG. 1 illustrates metadata according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates metadata according to an embodiment of the present invention. Referring to FIG. 1, the shown metadata illustrated is used to convert a two-dimensional (2D) image into a three-dimensional (3D) image and includes background depth information and object depth information. The metadata may further include other data, such as video data identification (ID) information (not shown) to identify video data that the metadata corresponds to and/or disc ID information (not shown) to identify a disc (such as a CD, a DVD, a Blu-ray disc, etc.) in which the video data is recorded.

A frame of the video data may be divided into an image forming a background and an image for an object excluding the background. Depth information for the background (i.e., the background depth information) is used to give a feeling of depth to the image forming the background. Specifically, the background is reproduced as a cubic 3D image by adding the feeling of depth to the composition of the background, such as the position or shape of the background.

In each frame, the composition of the background may vary. A metadata generating apparatus (not shown) and an image processing apparatus (not shown) to convert a 2D image into a 3D image by using the metadata may store standardized (i.e., predetermined) information indicating various compositions of the background. In this case, the background depth information may include information about a composition type indicating which one of the standardized compositions corresponds to a background of a frame. Moreover, the background depth information may include coordinates of a background in a 2D image, a depth value of the background to be applied to the coordinates, and a depth value of a panel position.

The coordinates of the background are coordinates of pixels expressing the background included in the 2D image. The depth value is the degree of depth to be added to the 2D image, and the background depth information includes a depth value of each pixel expressing the background. The panel position is a position of an actual screen on which an image is formed, and the depth value of the panel position is the degree of depth of the screen on which the image is formed.

The object is an object excluding a background in a frame, such as a person or a building that stands vertically in contact with the background and a matter which floats in the air. The object depth information is used to give the feeling of depth to the object.

The object depth information includes region indicating information to identify an object region. The region indicating information is used to identify the object region in a 2D image and may be given for each object. If a plurality of objects is included in a single frame, region indicating information may be given for each of the objects. In aspects of the present invention, a single object may be divided into a plurality of sub-regions by selection of an author. Each of the sub-regions may be a transparent region or an opaque region. Furthermore, in aspects of the present invention, the author is a person who desires to edit and generate metadata used to convert a 2D image into a 3D image. Specifically, the author inputs a predetermined control signal into a metadata generating apparatus 100 (illustrated in FIG. 2) to generate the metadata. If the author desires to divide an object into a plurality of sub-regions and incorporate information about the plurality of sub-regions into the metadata, the author may input, into the metadata generating apparatus 100, information to identify the plurality of sub-regions and information indicating whether each sub-region is a transparent region or an opaque region. The information input into the metadata generating apparatus 100 by the author in order to divide an object into a plurality of sub-regions will hereinafter be called sub-region dividing information. Thus, the sub-region dividing information may include information indicating whether each sub-region is a transparent region or an opaque region.

The metadata generating apparatus 100 generates region indicating information to identify the object region. The region indicating information may be coordinates to identify pixels corresponding to an object region among all pixels forming a frame or a mask in which the object region is indicated with a different color. When a mask where an object region is indicated is used as the region indicating information, one or more masks are used for each object.

The object depth information further includes sub-region indicating information to identify each sub-region according to the sub-region dividing information. The sub-region indicating information may be coordinates to identify the sub-region or a mask where the sub-region is indicated with a different color. When a mask where a sub-region is indicated is used as the sub-region indicating information, a plurality of masks may be used to indicate each sub-region.

The object depth information also includes a depth value to be applied to an object region identified by the region indicating information. If an object is divided into a plurality of sub-regions, the object depth information may include a depth value to be applied to each sub-region. Depth values to be applied to each sub-region may or may not be the same. The object depth information may further include information (not shown) about a time at which a frame including an object is output.

In order to give a cubic effect to a 2D image, the feeling of depth is be added to the 2D image. When a person sees a screen, an image projected on the screen is formed in each of the two eyes. A distance between two points of the images formed in the eyes is called parallax, which can be classified into positive parallax, zero parallax, and negative parallax. The positive parallax refers to parallax corresponding to a case when the image appears to be formed inside the screen, and is the same as or smaller than a distance between the eyes. As the positive parallax increases, a cubic effect by which the image appears to lie behind the screen is given.

When the image appears to be two-dimensionally formed on the screen plane, a parallax is 0 (i.e., zero parallax). For a parallax of 0, a user cannot feel a cubic effect because the image is formed on the screen plane. The negative parallax refers to parallax corresponding to a case when the image appears to lie in front of the screen. This parallax is generated when lines of sight intersect. The negative parallax gives a cubic effect by which the image appears to protrude forward.

Since human eyes are spaced a predetermined distance apart in a horizontal direction, the left eye and the right eye see a 2D image differently. The brain combines two different 2D images seen by the left eye and the right eye, thereby generating a 3D image having perspective and presence. The two different 2D images seen by the left eye and the right eye are images in which predetermined pixels of the original 2D image are mapped to positions moved a predetermined distance to the left and to the right, respectively.

For conversion of a 2D image into a 3D image, the feeling of depth is added to the 2D image, and a position of a point to which a predetermined pixel of the 2D image is mapped in each of the left view image and the right view image varies with the feeling of depth to be added to the 2D image. As a parallax with respect to the 2D image increases (that is, the degree of the feeling of depth to be added to the 2D image increases), a position at which a predetermined pixel of the 2D image is to be formed in each of the left view image and the right view image becomes more distant from the original position of the predetermined pixel in the 2D image. Thus, if an author desires to add different degrees of the feeling of depth to the object and the background in a 2D image frame, positions to which pixels corresponding to the object and the background are mapped in a left view image and a right view image, generated during conversion of a 2D image into a 3D image (that is, distances pixels corresponding to the object and the background move to the left and to the right in the left view image and the right view image), differ between the object and the background.

For example, if different degrees of the feeling of depth are to be added to the object and the background such that the object appears closer to a viewer than the background, a distance that the object moves to the left and to the right is less than a distance that the background moves to the left and to the right in the left view image and the right view image, respectively, generated during conversion of the 2D image into the 3D image.

Figure 2:
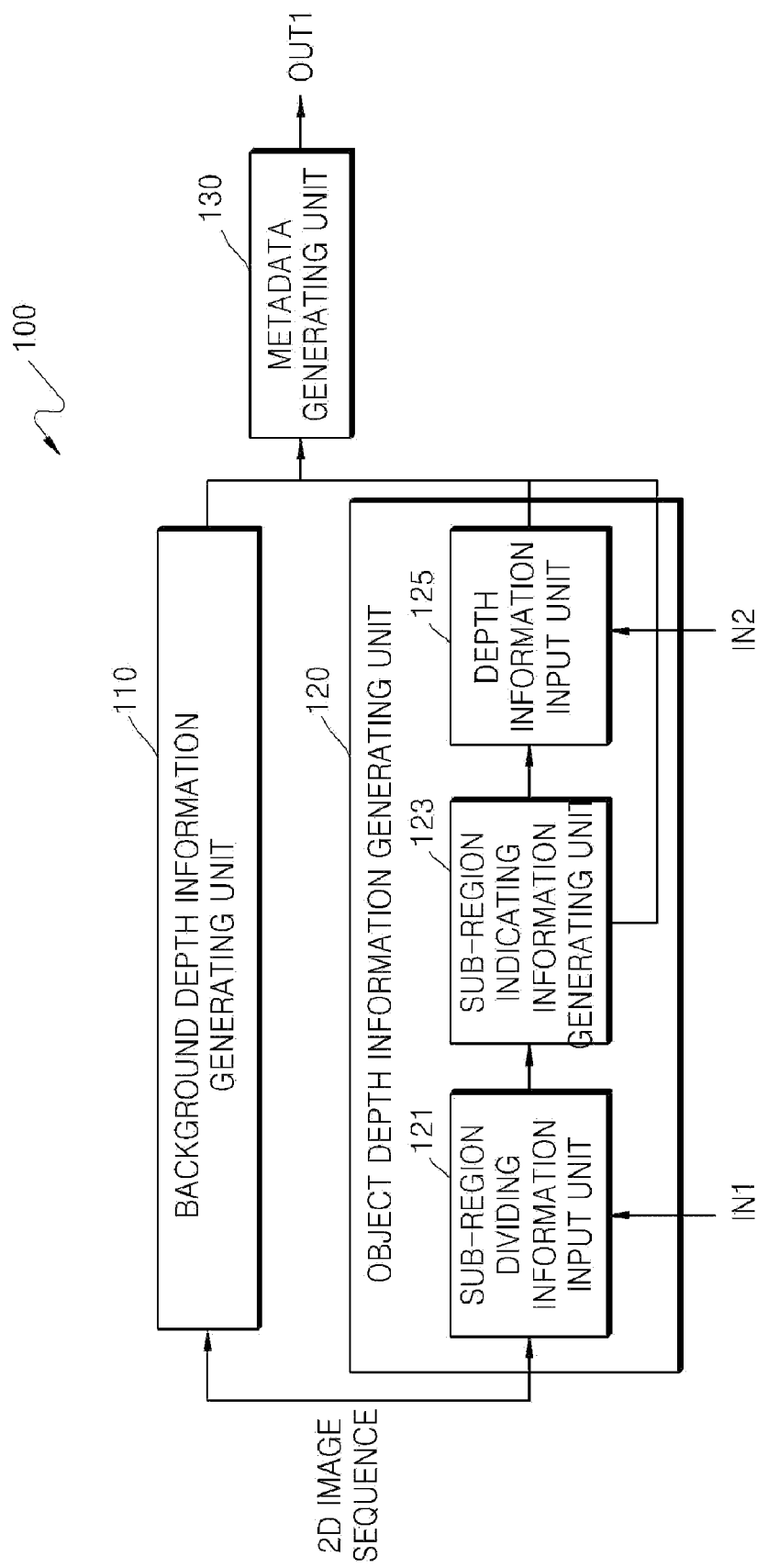
FIG. 2 is a block diagram of a metadata generating apparatus according to an embodiment of the present invention, which generates the metadata illustrated in FIG. 1.

FIG. 2 is a block diagram of the metadata generating apparatus 100 that generates the metadata illustrated in FIG. 1, according to an embodiment of the present invention. Referring to FIG. 2, the metadata generating apparatus 100 includes a background depth information generating unit 110, an object depth information generating unit 120, and a metadata generating unit 130. While not required, each of the units 110, 120, 130 can be one or more processors or processing elements on one or more chips or integrated circuits. Furthermore, the metadata generating apparatus 100 may be a computer, a laptop computer, a mobile device, a workstation, a camera, etc.

The background depth information generating unit 110 receives an input of a 2D image sequence and generates background depth information to add the feeling of depth to a background included in a 2D image. As described with reference to FIG. 1, the background depth information may include information indicating a composition of the background, coordinates of the background, a depth value of the background corresponding to the coordinates, and/or a depth value of a panel position that indicates a depth value of an actual screen on which an image is formed. The background depth information generating unit 110 outputs the generated background depth information to the metadata generating unit 130.

The object depth information generating unit 120 receives an input of the 2D image sequence and generates object depth information to add the feeling of depth to an object included in the 2D image. The object depth information includes region indicating information to identify an object region, sub-region indicating information to identify each sub-region if the object is divided into a plurality of sub-regions, and depth information to be applied to the identified region and/or the identified sub-region. The object depth information generating unit 120 includes a sub-region dividing information input unit 121, a sub-region indicating information generating unit 123, and a depth information input unit 125.

An object may be divided into a plurality of sub-regions by author's selection, as discussed above. The author may control the metadata generating apparatus 100 so that a depth value to be applied to each sub-region is included in metadata. To this end, by using the sub-region dividing information input unit 121, the author may input sub-region dividing information IN1 including information to divide an object into a plurality of sub-regions and information indicating whether each sub-region is a transparent region or an opaque region, though it is understood that aspects of the present invention are not limited thereto. For example, the metadata generating apparatus 100 may set a sub-region as an opaque region by default such that only when a sub-region is a transparent region does the author input information indicating the transparent region into the sub-region dividing information input unit 121 (or vice-versa).

In aspects of the present invention, a transparent region of an object is a region where a background can be seen through the object. An opaque region of the object is a region of the object excluding the transparent region. For example, if an object is a balloon, a grip portion of the balloon is an opaque region and the remaining portion of the balloon is a transparent region through which the background can be seen. In addition, in aspects of the present invention, it is presumed that a transparent region is a region in which only a part of an edge thereof meets an opaque region.

If a background portion seen through a transparent region of an object is handled as a single object like an opaque region such that a different depth value than that of a background is applied to the object, a distance the object moves to the left and a distance the background moves to the left differ from each other in a left view image generated during conversion of a 2D image into a 3D image. Similarly, a distance the object moves to the right and a distance the background moves to the right differ from each other in a right view image generated during the conversion.

A depth value indicates the degree of depth of an image. In aspects of the present invention, the depth value may be one of 256 values from 0 to 255. As the depth value decreases towards 0, the image appears to recede more and more and thus become more distant from a viewer. Conversely, as the depth value increases towards 255, the image appears to approach the viewer.

If the depth value of the object is greater than that of the background, a background portion within a transparent region of the object is positioned to the right of a position of the actual background portion in a left view image generated during conversion of a 2D image into a 3D image. Similarly, the background portion within the transparent region of the object is positioned to the left of a position of the actual background portion in a right view image generated during the conversion. Moreover, the background portion outside of the object and the background portion inside of the object, which is seen through the transparent region of the object, do not meet each other, as will be described below with reference to FIGS. 7A and 7B.

Figure 7A:
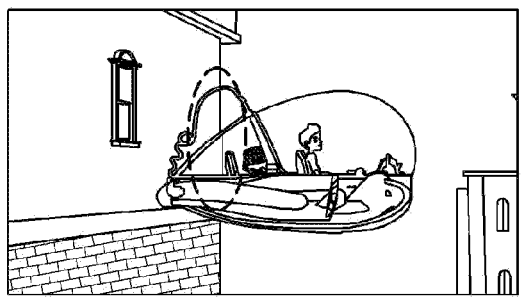
FIGS. 7A and 7D illustrate a left view image and a right view image generated when an image processing apparatus according to an embodiment of the present invention converts a two-dimensional (2D) image into a three-dimensional (3D) image if an object including a transparent region is handled as a single object rather than being divided into the transparent region and an opaque region.
Figure 7B:
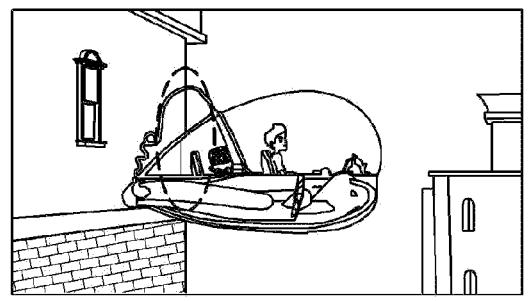

FIGS. 7A and 7B illustrate a left view image and a right view image generated when an image processing apparatus converts a 2D image into a 3D image if an object including a transparent region is handled as a single object rather than being divided into the transparent region and an opaque region. In FIGS. 7A and 7B, an aircraft is an object including both a transparent region and an opaque region. Specifically, the transparent region corresponds to a portion of the aircraft that is made of transparent glass.

In order for a user to feel that an aircraft appears to be closer than a background behind the aircraft in a 3D image, a depth value applied to the aircraft is larger than that applied to the background. As a depth value increases, distances between positions to which a predetermined pixel of a 2D image is mapped in a left view image and a right view image and the original position of the predetermined pixel in the 2D image decrease. Thus, a distance the background moves to the left is greater than a distance the aircraft moves to the left in the left view image. Similarly, a distance the background moves to the right is greater than a distance the aircraft moves to the right in the right view image. In this case, a background portion seen through the aircraft shifts to the right with respect to a background portion outside the aircraft in the left view image as illustrated in FIG. 7A. Likewise, the background portion seen through the aircraft shifts to the left with respect to the background portion outside the aircraft in the right view image as illustrated in FIG. 7B. Accordingly, the background portion seen through the transparent region and the actual background portion behind the transparent region of the object do not meet (i.e., intersect) each other.

In order to prevent such a phenomenon, the author may input sub-region dividing information into the sub-region dividing information input unit 121 so that an object is divided into a transparent region and an opaque region. The sub-region dividing information input unit 121 receives an input of the sub-region dividing information and sends the input sub-region dividing information to the sub-region indicating information generating unit 123.

The sub-region indicating information generating unit 123 generates sub-region indicating information to identify each of a plurality of sub-regions divided according to the author's selection. The sub-region indicating information may be coordinate information indicating coordinates of a region or a mask in which each sub-region is indicated. The sub-region indicating information generating unit 123 generates the sub-region indicating information to separately indicate each transparent sub-region and each opaque sub-region.

If a mask is used as sub-region indicating information, the sub-region indicating information generating unit 123 generates a transparent region indicating mask in which a transparent region is indicated and/or an opaque region indicating mask in which an opaque region is indicated. As an example, the sub-region indicating information generating unit 123 may generate, as the opaque region indicating mask, a mask in which only an opaque region of an object has a first color and the remaining region of the 2D image except for the opaque region has a second color different from the first color. Moreover, the sub-region indicating information generating unit 123 may generate, as the transparent region indicating mask, a mask in which only a portion of an edge of the transparent region, which does not meet the opaque region, has the first color and the remaining region of the 2D image except for the portion having the first color has the second color.

If coordinate information is used as the sub-region indicating information, the sub-region indicating information generating unit 123 may generate coordinate information to separately indicate a transparent region and an opaque region. In this case, the sub-region indicating information generating unit 123 may generate coordinate information that indicates the transparent region with coordinates indicating only a portion of an edge of the transparent region, which does not meet the opaque region.

As such, in some aspects of the present invention, the sub-region indicating information generating unit 123 generates a mask indicating only a portion of an edge of a transparent region, which does not meet an opaque region, instead of indicating the entire edge of the transparent region, as the transparent region indicating mask to indicate the transparent region. Furthermore, in other aspects, the sub-region indicating information generating unit 123 generates coordinate information indicating the transparent region with coordinates indicating only the portion of the edge of the transparent region, which does not meet the opaque region, thus omitting information to indicate a region overlapping the opaque region.

The depth information input unit 125 receives, from the author, an input of depth information to be applied to a sub-region identified by the sub-region indicating information generating unit 123. If an object is divided into a plurality of sub-regions, the depth information input unit 125 may receive inputs of depth information for each sub-region. The sub-region indicating information generating unit 123 and the depth information input unit 125 output the sub region indicating information and the depth information, respectively, to the metadata generating unit 130.

The metadata generating unit 130 generates metadata to convert a 2D image into a 3D image by using background depth information received from the background depth information generating unit 110 and object depth information received from the object depth information generating unit 120. If an object is divided into a plurality of sub-regions (e.g., a transparent region and an opaque region), the metadata generating unit 130 generates metadata including coordinate information indicating each of the transparent region and the opaque region and/or masks that separately indicate the transparent region and the opaque region, and a depth value to be applied to each identified sub-region.

Figures 2, 3B:
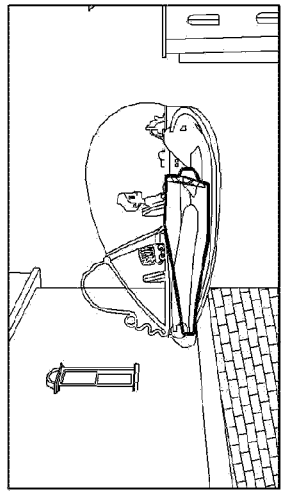
FIGS. 3A to 3C are views to explain a division of an object into a plurality of sub-regions.
Figures 1, 3B:
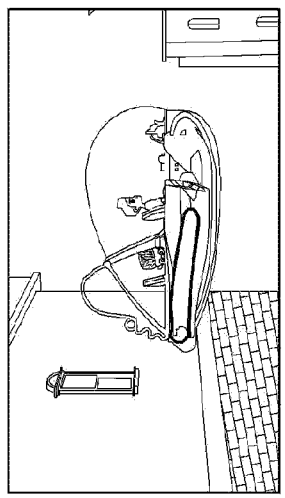
Figures 3, 3B, 4:
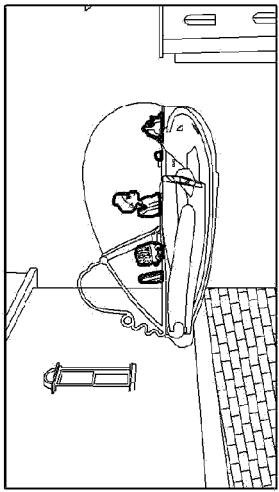
Figures 3, 3B:
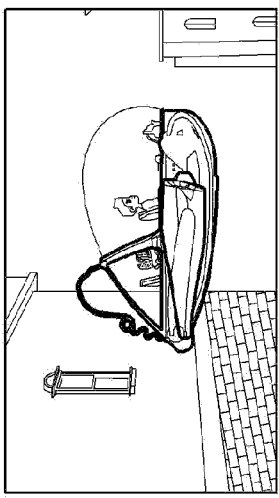
Figure 3C:
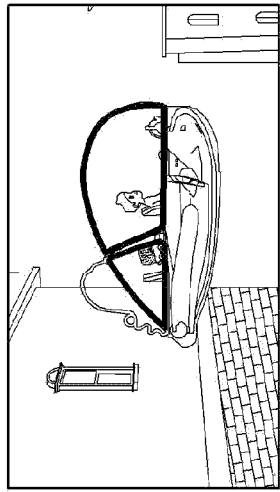
Figure 3A:
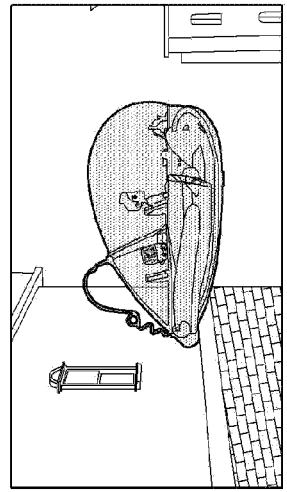

FIGS. 3A to 3C are views to explain a division of an object into a plurality of sub-regions. Referring to FIGS. 3A to 3C, it can be seen that a 2D image includes a background that includes a building and the sky, and an object that is an aircraft having a front cover made of transparent glass.

In FIG. 3A, the object (i.e., the aircraft) is indicated. As mentioned above, the author may divide the object into several sub-regions and apply a depth value to each sub-region in order to express the object in three dimensions. FIGS. 3-B-1 to 3-B-4 and FIG. 3C show that the object is divided into a total of 5 sub-regions according to the author's selection. FIGS. 3-B-1 to 3-B-4 illustrate opaque regions from among the sub-regions using the bold lines. FIG. 3C illustrates a transparent region (i.e., a cover region of the aircraft) from among the sub-regions using the bold lines.

The author inputs information indicating whether each sub-region is a transparent region or an opaque region into the metadata generating apparatus 100. The metadata generating apparatus 100 generates sub-region indicating information for each sub-region by using the input information. The metadata generating apparatus 100 also generates sub-region indicating information separately for a transparent region and an opaque region.

Figure 4A:
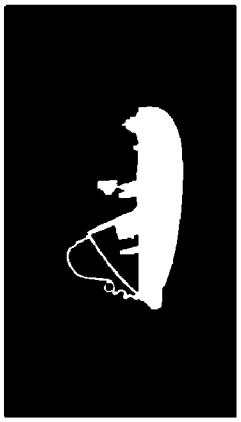
FIGS. 4A to 4C are views to explain a case where a mask is used as sub-region indicating information to indicate each of the plurality of sub-regions of the object illustrated in FIGS. 3A to 3C.
Figures 2, 4B:
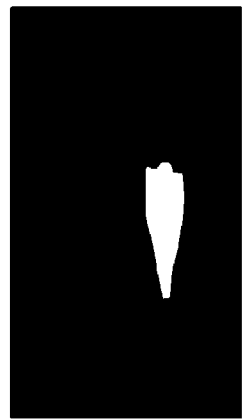
Figures 4, 4B:
Figures 1, 4B:
Figures 3, 4B:
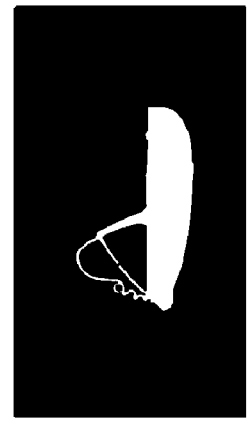
Figure 4C:
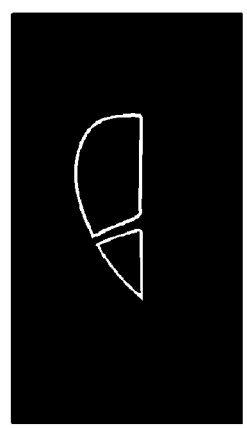

FIGS. 4A to 4C are views to explain a case where a mask is used as sub-region indicating information to identify each of the plurality of sub-regions of the object illustrated in FIGS. 3A to 3C. The sub-region indicating information generating unit 123 generates four opaque region indicating masks for indicating each of four opaque regions illustrated in FIGS. 3-B-1 to 3-B-4, as illustrated in FIGS. 4-B-1 to 4-B-4. In the opaque region indicating masks (FIGS. 4-B-1 to 4-B-4), the opaque regions have the first color and the remaining regions of the 2D image except for the opaque regions have the second color. FIG. 4A illustrates a mask in which sub-regions indicated by the opaque region indicating masks illustrated in FIGS. 4-B-1 to 4-B-4 are combined, such that the mask indicates all opaque regions of a single object. FIG. 4C illustrates a mask indicating an edge of the transparent region illustrated in FIG. 3C.

Figure 5:
FIG. 5 illustrates a transparent region indicating mask that a sub-region indicating information generating unit generates by using the masks illustrated in FIGS. 4A to 4C, according to an embodiment of the present invention.

FIG. 5 illustrates a transparent region indicating mask generated by the sub-region indicating information generating unit 123 by using the masks illustrated in FIGS. 4A to 4C, according to an embodiment of the present invention. As previously described, a transparent region is a region, a part of an edge of which meets an opaque region. Accordingly, in some aspects of the present invention, the transparent region indicating mask indicates an edge of the transparent region that does not intersect with the opaque region. The sub-region indicating information generating unit 123 generates the transparent region indicating mask or the coordinate information in order to prevent an actual background and a background portion seen through a transparent region of an object from not meeting each other. Specifically, without the transparent region indicating mask or the coordinate information, a distance that the background portion seen through the transparent region moves is different from a distance that the actual background moves in each of a left view image and a right view image generated during conversion of a 2D image into a 3D image.

Once the metadata generating apparatus 100 recognizes that a predetermined sub-region of an object is a transparent region and the remaining sub-regions are opaque regions by using the input sub-region dividing information, the metadata generating apparatus 100 generates an opaque region indicating mask that combines all opaque sub-regions (as illustrated in FIG. 4A), and generates a transparent region indicating mask (as illustrated in FIG. 5) by using a mask indicating an edge of the transparent region illustrated in FIG. 4C and the opaque region indicating mask illustrated in FIG. 4A.

The metadata generating apparatus 100 generates, as a transparent region indicating mask, a mask in which only a portion of an edge of a transparent region that does not overlap with an opaque region is indicated with the first color and the remaining region except for the region indicated with the first color is indicated with the second color. The metadata generating apparatus 100 generates metadata which includes the opaque region indicating mask illustrated in FIG. 4A, the transparent region indicating mask illustrated in FIG. 5, and a depth value to be applied to each region identified by a mask. If the opaque region includes a plurality of sub-regions, the metadata generating apparatus 100 may generate metadata that includes information about a region mask to identify each of the plurality of sub-regions (as illustrated in FIGS. 4-B-1 to 4-B-4) and a depth value to be applied to each sub-region. However, it is understood that aspects of the present invention are not limited to the indicating of the sub-regions using masks. As described above, according to other aspects, coordinate information may be used to indicate the sub-regions. Furthermore, in some aspects, a combination of one or more masks and coordinate information may be used (for example, coordinate information indicating an object and a mask indicating all edges of the transparent region may be used, or coordinate information indicating an object and a mask indicating all opaque regions).

FIG. 6 is a block diagram of an image processing apparatus 600 according to an embodiment of the present invention. Referring to FIG. 6, the image processing apparatus 600 includes a metadata analyzing unit 610, a mask buffer 620, a depth map generating unit 630, and a stereo rendering unit 640. While not required, each of the units 610, 620, 630, 640 can be one or more processors or processing elements on one or more chips or integrated circuits. Furthermore, the image processing apparatus 600 may be a computer, a laptop computer, a mobile device, a workstation, a television, a set-top box, etc. The image processing apparatus 600 receives metadata from an optical disc (such as a DVD, a Blu-ray disc, a CD, etc.), a storage medium, a network (such as the Internet), and/or from another device through a wired and/or wireless connection. While not required, the image processing apparatus 600 can include a drive to read the disc directly, or can be connected to a separate drive.

The metadata analyzing unit 610 extracts depth information from metadata and analyzes the extracted depth information. Specifically, the metadata analyzing unit 610 extracts background depth information for a background included in a frame and analyzes the background depth information. Furthermore, the metadata analyzing unit 610 extracts an output time of a frame including an object. If an output time of a current frame is included in the output time of the frame including the object, the metadata analyzing unit 610 extracts object depth information for an object included in the current frame from the metadata and analyzes the object depth information, and outputs the analyzed object depth information to the depth map generating unit 630. However, it is understood that aspects of the present invention are not limited thereto, and the metadata analyzing unit 610 may simply extract, analyze, and output the object depth information irrespective of any output times.

If a mask is defined as region indicating information for the object included in the current frame, a mask indicating a region of the object included in the current frame is stored in the mask buffer 620. In order to indicate a single object, one or more masks are used. If an object is divided into a plurality of sub-regions, a plurality of masks to indicate each sub region is used, as illustrated in FIGS. 4A to 4C.

The depth map generating unit 630 includes a background depth map generating unit 631 and an object depth map generating unit 633. The background depth map generating unit 631 generates a background depth map by using the background depth information received from the metadata analyzing unit 610. The background depth information may include type information of a background, coordinates of the background, a depth value of the background corresponding to the coordinates, and/or a depth value of a panel position. The background depth map generating unit 631 outputs the generated background depth map to the stereo rendering unit 640. The background depth map generating unit 631 may filter the background depth map before outputting the background depth map to the stereo rendering unit 640.

The object depth map generating unit 633 generates an object depth map by using region indicating information indicating a region of an object and a depth value to be applied to the region of the object, which are included in the object depth information. If an object is divided into a plurality of sub-regions, the object depth map generating unit 633 generates a depth map in which different depth values are applied to different sub-regions of the object by using sub-region indicating information and a depth value to be applied to each sub-region. The region indicating information or the sub-region indicating information may be information indicating coordinates of a region of an object and/or a mask in which the region of the object is indicated.

If the region indicating information for the object is a mask, the object depth map generating unit 633 receives a mask to be applied to a frame from the mask buffer 620 and identifies the region of the object by using the received mask. If coordinate information is defined as region indicating information for an object included in a current frame, the object depth map generating unit 633 generates a depth map for the object by allocating a depth value to each sub-region identified by using the coordinate information indicating each sub-region.

If an object includes both a transparent region and an opaque region (as illustrated in FIGS. 3A to 3C) and the received metadata includes sub-region indicating information to identify the transparent region and the opaque region as coordinate information or mask information, the object depth map generating unit 633 may generate a depth map for the object by using separate sub-region indicating information to identify the transparent region and the opaque region. If the sub-region indicating information is given as masks (as illustrated in FIGS. 4A and 5), the object depth map generating unit 633 identifies sub-regions of the object by using the masks and applies depth values received from the metadata analyzing unit 610 to the sub-regions identified by the masks, thereby generating a depth map for the object.

If the opaque region includes a plurality of sub-regions, the object depth map generating unit 633 extracts information about a plurality of masks to identify each of the plurality of sub-regions (as illustrated in FIGS. 4-B-1 to 4-B-4) and a depth value to be applied to each sub-region from the metadata. Accordingly, the object depth map generating unit 633 applies separate depth values to the plurality of sub-regions by using the extracted information, thereby expressing the opaque region in three dimensions. In this case, since a transparent region is allocated a predetermined depth value for only a portion thereof that does not meet an opaque region, an inside of the transparent region has the same depth value as that of an outside of the transparent region. The depth map generating unit 630 outputs the generated depth map to the stereo rendering unit 640.

The stereo rendering unit 640 generates a left view image and a right view image by using a decoded 2D image received from a video data decoding unit (not shown) and a depth map received from the depth map generating unit 630. The video data decoding unit may be provided in a separate device, or in a same device as the image processing apparatus 600. Furthermore, the 2D image may be provided to the video data decoding unit (not shown) from the same source as the metadata, or may be provided separately from the metadata. In this manner, existing video can be converted to 3D video through later received metadata.

As discussed above, if an object includes a transparent region and an opaque region, an opaque region indicating mask as illustrated in FIG. 4A and a transparent region indicating mask as illustrated in FIG. 5 may be included in metadata. Accordingly, a predetermined depth value is allocated to only a portion of the transparent region that does not meet the opaque region, and the inside of the transparent region has the same depth value as that of the outside of the transparent region. Accordingly, a pixel of a portion of a background inside the transparent region and a pixel of a portion of the background outside the transparent region move the same distance from the original position of the pixel in a 2D image in a left view image and a right view image generated during conversion of the 2D image into a 3D image.

Figure 7C:
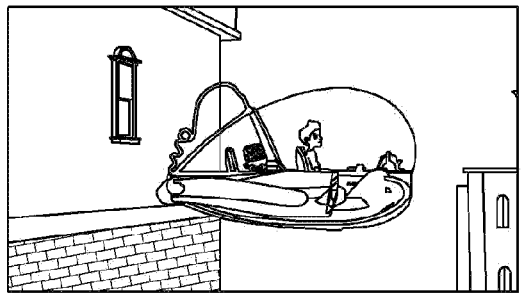
Figure 7D:
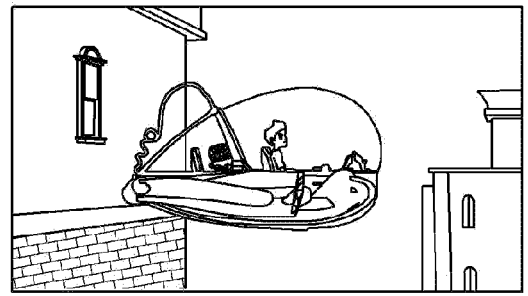

FIGS. 7C and 7D illustrate a left view image and a right view image generated by the image processing apparatus 600 illustrated in FIG. 6. If a depth value of an object is larger than that of a background such that a viewer perceives the background to be more distant than the object, distances that an opaque region of the object moves to the left and to the right are less than distances that the background behind the object moves to the left and to the right in the left view image and the right view image, respectively, generated during conversion of a 2D image into a 3D image. However, the transparent region inside the object is allocated a predetermined depth value for only a portion of an edge thereof which does not meet the opaque region, and thus a portion of the background inside the transparent region of the object has the same depth value as that of a portion of the background behind the object. Thus, in the left view image and the right view image, distances the background behind the object moves to the left and to the right and distances the transparent region inside the object moves to the left and to the right, respectively, are the same as each other. Accordingly, a portion of the background inside a transparent region of the object and a portion of the background outside the object meet each other.

A phenomenon in which human eyes perceive that other information is the same as peripheral information based on the peripheral information is called an optical illusion. In aspects of the present invention, even if a depth value of the inside of a transparent region of the object is the same as that of a background, human eyes perceive that a depth value of the transparent region of the object is the same as that of an opaque region of the object around the transparent region or a portion of an edge of the transparent region, which does not meet the opaque region.

The stereo rendering unit 640 generates a 3D-format image including both the left view image and the right view image. Examples of the 3D format may include a top-down format, a side-by-side format, and an interlaced format. The stereo rendering unit 640 outputs the 3D format-image to an output device (not shown), such as a cathode ray tube display device, a liquid crystal display, a plasma display, an organic light emitting diode display, goggles, etc. The image processing apparatus 600 may include the output device, or the output device may be external to the image processing apparatus 600. The output device sequentially outputs the left view image and the right view image to a screen. A viewer recognizes that an image is seamlessly reproduced when the image is output at a frame rate of at least 60 Hz with one eye. Thus, in order to cause the viewer to perceive a combination of images input to the left and right eyes as a 3D image, the output device outputs the images at a frame rate of at least 120 Hz. That is, the output device sequentially displays the left view image and the right view image included in a frame at least every 1/120 second.

According to aspects of the present invention, a metadata generating method and apparatus and an image processing method and apparatus using metadata are provided in which an object is divided into a plurality of sub-regions, metadata including sub-region indicating information indicating each of the sub-regions is generated, and a 2D image can be naturally converted into a 3D image by using the generated metadata during image processing.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A sub-region indicating information generating method for a two-dimensional (2D) image comprising a background and an object, the method comprising:
    receiving sub-region dividing information to divide the object into a plurality of sub-regions, wherein the sub-region dividing information comprises information to divide the object into a transparent region through which the background is visible and an opaque region through which the background is not visible; and
    generating, by a generating apparatus, sub-region indicating information to separately identify each of the plurality of sub-regions divided according to the sub-region dividing information, wherein the generating of the sub-region indicating information comprises generating the sub-region indicating information to separately identify the transparent region and the opaque region,
    wherein the generated sub-region indicating information is used to convert the 2D image of the object into a three-dimensional (3D) image of the object relative to the background,
    wherein the generating of the sub-region indicating information to separately identify the transparent region and the opaque region comprises:
        generating a transparent region indicating mask to identify the transparent region; and
        generating an opaque region indicating mask to identify the opaque region, and
    wherein the generating of the opaque region indicating mask comprises generating a mask in which the opaque region has a first color and a remaining region of the 2D image other than the opaque region has a second color, different from the first color.

2. The method as claimed in claim 1, wherein a portion of an edge of the transparent region meets the opaque region, and the generating of the transparent region indicating mask comprises generating a mask in which a portion of the edge of the transparent region that does not intersect with the opaque region has the first color, and the portion of the edge of the transparent region that intersects with the opaque region has the second color.

3. The method as claimed in claim 2, further comprising generating metadata to convert the 2D image into the 3D image,
    wherein the generated metadata comprises information about the transparent region indicating mask and the opaque region indicating mask and depth values to be respectively applied to the corresponding sub-regions identified by the transparent region indicating mask and the opaque region indicating mask.

4. The method as claimed in claim 1, wherein the generating of the sub-region indicating information to separately identify the transparent region and the opaque region comprises generating coordinate information to separately identify the transparent region and the opaque region.

5. The method as claimed in claim 4, wherein a portion of an edge of the transparent region meets the opaque region, and the generating of the coordinate information comprises generating transparent region coordinate information to separately identify the transparent region, the generated transparent region coordinate information indicating only a portion of the edge of the transparent region that does not intersect with the opaque region.

6. The method as claimed in claim 5, further comprising generating metadata to convert the 2D image into the 3D image,
wherein the generated metadata comprises coordinate information to indicate the transparent region, coordinate information to indicate the opaque region, and respective depth values to be applied to the corresponding coordinate information.

7. A computer-readable recording medium having recorded thereon metadata used by an image processing apparatus to convert a two-dimensional (2D) image into a three-dimensional (3D) image, wherein the metadata comprises:
depth information to add depth to a background included in the 2D image; and
object depth information to add depth to an object included in the 2D image, wherein the object depth information comprises sub-region indicating information to separately identify a transparent region of the object through which the background is visible and an opaque region of the object through which the background is not visible, a transparent depth value to be applied by the image processing apparatus to the transparent region, and an opaque depth value to be applied by the image processing apparatus to the opaque region,
wherein the sub-region indicating information comprises an opaque region indicating mask to identify the opaque region, and
wherein the opaque region indicating mask is a mask in which the opaque region has a first color and a remaining region of the 2D image other than the opaque region has a second color, different from the first color.

8. The computer-readable recording medium as claimed in claim 7, wherein the sub-region indicating information further comprises a transparent region indicating mask to identify the transparent region.

9. The computer-readable recording medium as claimed in claim 8, wherein:
the opaque region indicating mask is a mask in which the opaque region has a first color and a remaining region of the 2D image other than the opaque region has a second color, different from the first color; and
the transparent region indicating mask is a mask in which a portion of an edge of the transparent region that does not intersect with the opaque region has the first color, and a remaining portion of the edge of the transparent region that intersects with the opaque region has the second color.

10. The computer-readable recording medium as claimed in claim 7, wherein the sub-region indicating information comprises coordinate information to separately identify the transparent region and the opaque region.

11. The computer-readable recording medium as claimed in claim 10, wherein the coordinate information comprises transparent region coordinate information to separately identify the transparent region, the transparent region coordinate information indicating only a portion of an edge of the transparent region that does not intersect with the opaque region.

12. A depth information generating apparatus comprising:
a background depth information generating unit to generate depth information for a background of a 2D image; and
an object depth information generating unit to generate depth information for an object of the 2D image, wherein the object depth information generating unit comprises:
a sub-region dividing information input unit to receive sub-region dividing information to divide the object into a plurality of sub-regions, wherein the sub-region dividing information comprises information to divide the object into a transparent region through which the background is visible and an opaque region through which the background is not visible; and
a sub-region indicating information generating unit to generate sub-region indicating information to separately identify each of the plurality of sub-regions divided according to the sub-region dividing information, wherein the sub-region indicating information generating unit generates the sub-region indicating information to separately identify the transparent region and the opaque region, generates a transparent region indicating mask to identify the transparent region and an opaque region indicating mask to identify the opaque region, and generates, as the opaque region indicating mask, a mask in which the opaque region has a first color and a remaining region of the 2D image other than the opaque region has a second color, different from the first color.

13. The depth information generating apparatus as claimed in claim 12, wherein a portion of an edge of the transparent region meets the opaque region, and the sub-region indicating information generating unit generates, as the transparent region indicating mask, a mask in which a portion of the edge of the transparent region that does not intersect with the opaque region has the first color and the portion of the edge of the transparent region that intersects with the opaque region has the second color.

14. The depth information generating apparatus as claimed in claim 13, further comprising a metadata generating unit to generate metadata to convert the 2D image into a 3D image,
wherein the generated metadata comprises information about the transparent region indicating mask and the opaque region indicating mask and depth values to be respectively applied to the corresponding sub-regions identified by the transparent region indicating mask and the opaque region indicating mask.

15. The depth information generating apparatus as claimed in claim 12, wherein the sub-region indicating information generating unit generates coordinate information to separately identify the transparent region and the opaque region.

16. The depth information generating apparatus as claimed in claim 15, wherein a portion of an edge of the transparent region meets the opaque region, and the sub-region indicating information generating unit generates transparent region coordinate information to separately identify the transparent region, the generated transparent region coordinate information indicating only a portion of the edge of the transparent region that does not intersect with the opaque region.

17. The depth information generating apparatus as claimed in claim 16, further comprising a metadata generating unit to generate metadata to convert the 2D image into a 3D image,
wherein the generated metadata comprises coordinate information to identify the transparent region, coordinate information to identify the opaque region, and respective depth values to be applied to the corresponding coordinate information.

18. An image processing method comprising:
generating, by an image processing apparatus, a depth map for a background of a 2D image by using background depth information included in metadata corresponding to the 2D image;

generating, by the image processing apparatus, a depth map for an object of the 2D image by using object depth information included in the metadata; and generating a three-dimensional (3D) image from the 2D image according to the generated depth map, wherein the generating of the depth map for the object comprises generating the depth map for the object by using sub-region indicating information that separately identifies a transparent region of the object through which the background is visible and an opaque region of the object through which the background is not visible, the sub-region indicating information being included in the object depth information, wherein the sub-region indicating information comprises an opaque region indicating mask in which the opaque region has a first color and a remaining region of the 2D image other than the opaque region has a second color, different from the first color.

19. The image processing method as claimed in claim 18, wherein a portion of the transparent region meets the opaque region, and the sub-region indicating information further comprises a transparent region indicating mask in which a portion of an edge of the transparent region that does not intersect with the opaque region has the first color and a remaining portion of the edge of the transparent region that intersects with the opaque region has the second color.

20. The image processing method as claimed in claim 18, wherein the sub-region indicating information comprises coordinate information to separately identify the transparent region and the opaque region, and a portion of the transparent region meets the opaque region.

21. The image processing method as claimed in claim 20, wherein the coordinate information identifying the transparent region comprises coordinate information indicating a portion of an edge of the transparent region that does not intersect with the opaque region.

22. An image processing apparatus comprising:
a background depth map generating unit to generate a depth map for a background of a 2D image by using background depth information included in metadata corresponding to the 2D image; and
an object depth map generating unit to generate a depth map for an object of the 2D image by using object depth information included in the metadata, wherein the object depth map generating unit generates the depth map for the object by using sub-region indicating information that separately identifies a transparent region of the object through which the background is visible and an opaque region of the object through which the background is not visible, the sub-region indicating information being included in the object depth information, wherein the sub-region indicating information comprises an opaque region indicating mask in which the opaque region has a first color and a remaining region of the 2D image other than the opaque region has a second color, different from the first color.

23. The image processing apparatus as claimed in claim 22, wherein a portion of the transparent region meets the opaque region, and the sub-region indicating information further comprises a transparent region indicating mask in which a portion of an edge of the transparent region that does not intersect with the opaque region has the first color and a remaining portion of the edge of the transparent region that intersects with the opaque region has the second color.

24. The image processing apparatus as claimed in claim 22, wherein the sub-region indicating information comprises coordinate information to separately identify the transparent region and the opaque region, and a portion of the transparent region meets the opaque region, and.

25. The image processing apparatus as claimed in claim 24, wherein the coordinate information indicating the transparent region comprises coordinate information identifying a portion of an edge of the transparent region that does not intersect with the opaque region.

26. A depth information generating apparatus to generate depth information for an object of a 2D image relative to a background of the 2D image, the depth information generating apparatus comprising:
a sub-region dividing information input unit to receive sub-region dividing information to divide the object into a plurality of sub-regions, wherein the plurality of sub-regions comprises at least one transparent region through which the background is visible and at least one opaque region through which the background is not visible;
a sub-region indicating information generating unit to generate sub-region indicating information to separately identify each of the plurality of sub-regions according to the sub-region dividing information; and
a depth information input unit to receive respective depth values for the plurality of sub-groups.

27. The depth information generating apparatus as claimed in claim 26, wherein: the sub-region indicating information generating unit generates a first opaque mask to separately identify a first opaque region and a second opaque mask to separately identify a second opaque region; and the depth information unit receives a first depth value for the first opaque region and a second depth value, different from the first depth value, for the second opaque region.

28. The depth information generating apparatus as claimed in claim 26, wherein the depth information input unit receives a transparent region depth value for the at least one transparent region, the transparent region depth value being equal to a depth value of the background of the 2D image.

* * * * *